Sept. 25, 1945. C. L. LOGEMANN Re. 22,676
SHOE MACHINERY
Original Filed Feb. 15, 1943
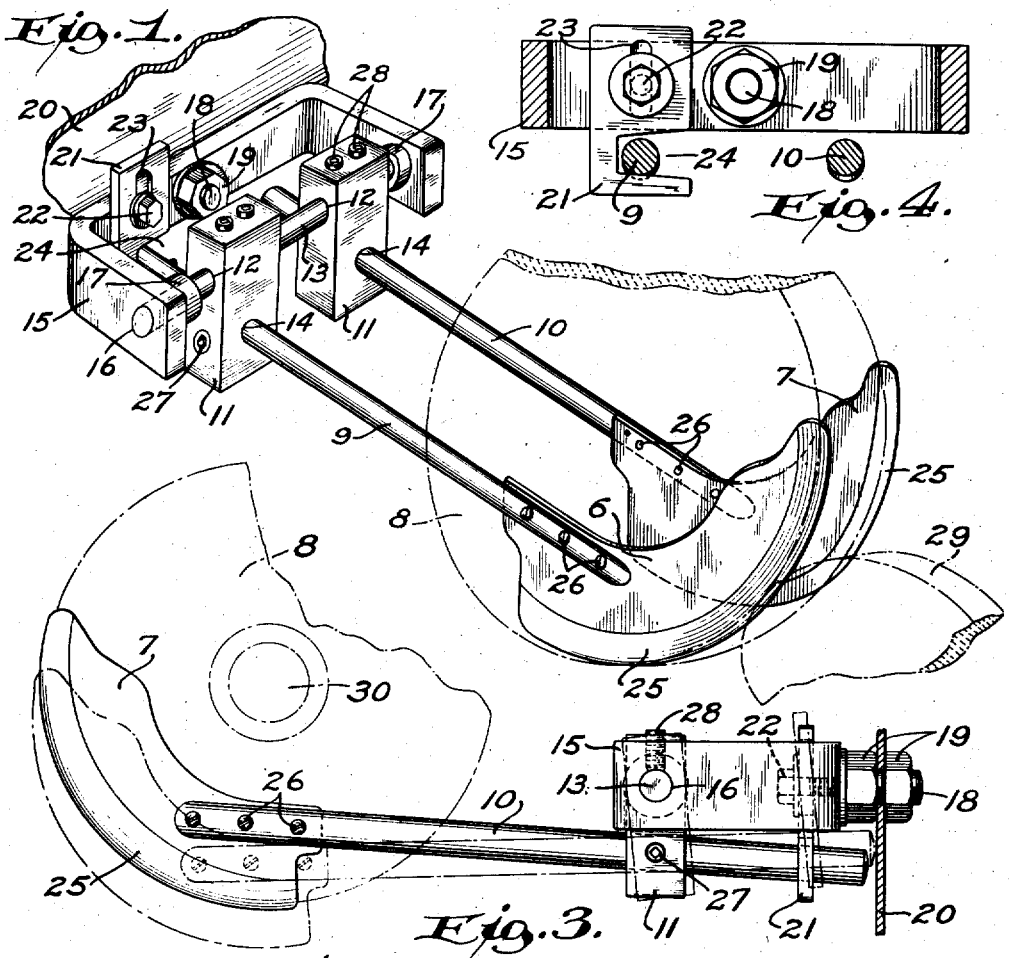
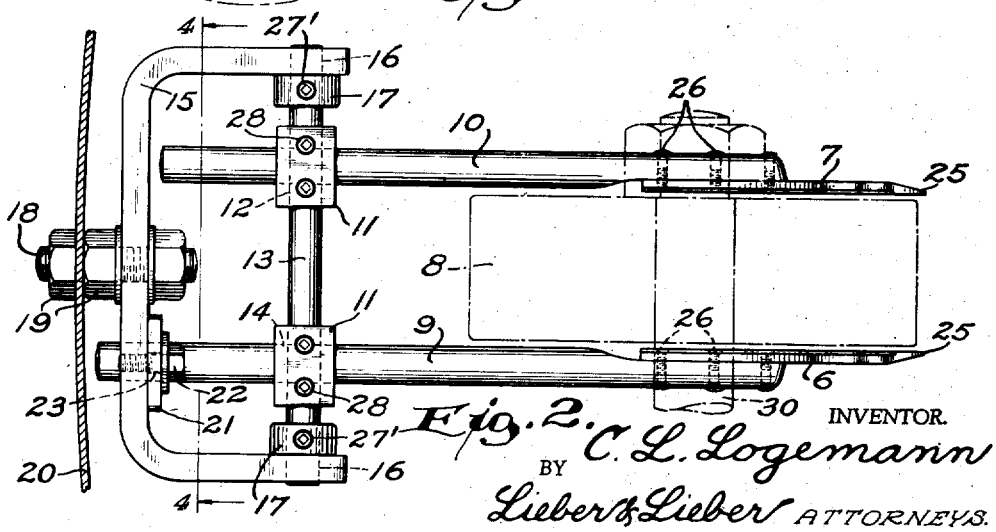
INVENTOR.
C. L. Logemann
BY
Lieber & Lieber ATTORNEYS.

Reissued Sept. 25, 1945

Re. 22,676

UNITED STATES PATENT OFFICE 22,676

SHOE MACHINERY

Clarence L. Logemann, Milwaukee, Wis.

Original No. 2,327,806, dated August 24, 1943, Serial No. 475,889, February 15, 1943. Application for reissue May 11, 1945, Serial No. 594,802

16 Claims. (Cl. 51—274)

The present invention relates in general to improvements in the art of shoe manufacture, and relates more specifically to improvements in the construction and operation of shoe making machinery, and especially equipment for dressing and finishing shoe heels after they have been attached to the soles and uppers.

An object of the invention is to provide an improved heel dressing assemblage which is simple in construction and highly efficient in use.

In the shoe manufacturing industry, it has long been customary to dress or scour the upper outer portion of the shoe heels, with the aid of sanding wheels against which these heel portions are pressed by an operator after the uppers have been applied to the soles and heels. The sanding wheels used for this scouring operation are rotatable at relatively high speed and are protected by a guard casing extending partially thereover, and unless the operator exercises extreme care and patience, the edges of the sanding wheels frequently come in contact with the outwardly extending uppers formed of leather or other materials, adjacent to the top of the heels, thus scuffing or otherwise damaging these uppers. In order to avoid such injury to the uppers, the operators were heretofore obligated to work rather slowly and carefully, thus losing considerable time, and while this annoyance has existed for many years, no satisfactory solution of the problem has heretofore been found.

It is therefore a more specific object of my present invention to provide improved mechanism of simple and durable construction, which will permit such heel scouring or dressing operations to be carried on more rapidly and without danger of damaging the shoe uppers, and will also produce more uniform heel seats and will thus add to the quality of the shoes.

Another specific object of this invention is to provide an improved abrasive wheel guard assemblage which is more flexible in its adaptations, and which is moreover cooperable with standard sanding wheel and guard casing assemblages of different sizes.

Still another specific object of the invention is to provide a new and useful device for sanding the external curved surfaces of the shoe heels, which will automatically and positively prevent the abrasive surfaces from contacting the uppers of the shoes to which the heels are applied, and which will moreover simplify the heel scouring operation considerably.

An additional specific object of the present invention is to provide a conveniently applicable and readily adjustable guard attachment for shoe heel dressing machines, which is applicable as a unit to standard heel dressing wheel assemblages, and which may be manufactured at moderate cost.

A further specific object of my invention is to provide an improved safety device for shoe heel dressing wheels, which will materially enhance the production of shoes with utmost safety and at minimum cost.

These and other specific objects and advantages of my invention will be apparent from the following detailed description.

A clear conception of the several features constituting my present improvement, and of the mode of constructing and of utilizing abrasive wheel safety guards embodying the invention, may be had by referring to the drawing accompanying and forming a part of this specification wherein like reference characters designate the same or similar parts in the various views.

Figure 1 is a front and side perspective view of one of my improved abrasive wheel guard assemblages showing a fragment of the main guard casing, and also showing a fragment of a shoe heel co-acting with a fragment of an abrasive wheel in dot-and-dash lines;

Figure 2 is a top view of the assemblage of Figure 1, showing the improved device suspended from a fragment of the main guard casing which is shown in section, and also showing the abrasive wheel in dot-and-dash lines;

Figure 3 is a side view of the same assemblage, showing the limits of angular adjustment of the two guard plates which cooperate with the opposite sides of the wheel, in solid and dot-and-dash lines; and Figure 4 is a section through the improved guard assembly taken along the line 4—4 and looking rearwardly.

While the invention has been shown and described herein as being especially adapted for application to the heel scouring wheels of shoe making machinery, it is not my desire or intent to unnecessarily restrict the scope or utility of the improvement, features of which may obviously be advantageously applied to other types of sanding and abrasive equipment.

Referring to the drawing, the improved heel scouring assemblage shown therein comprises in general a pair of approximately parallel guard plates 6 and 7 adapted for disposition on opposite sides of the lower front portion of a sanding wheel 8, and being rigidly attached to the front ends of suspension rods 9 and 10, respectively; a pair of laterally spaced blocks 11 having alined transverse upper openings 12 adjustably coacting with a horizontal pivot shaft 13, and also being provided with lower through openings 14 within which the rear portions of the rods 9 and 10 are adjustably secured; a U-shaped frame or bracket 15 having alined holes 16 near its opposite ends and in which the extreme ends of the pivot shaft 13 are confined by collars 17 secured to the shaft 13; an attaching stud 18 and nuts 19 for adjustably fastening the medial portion of the bracket 15 to the rear portion of the main guard casing 20 of the sanding wheel 8; and a swing limiting element or plate 21 vertically adjustably secured to the bracket 15 by means of a cap screw 22 coacting with a slot 23 in the plate, and having a lower side notch 24 within which the rear end of the longer suspension rod 9 is normally loosely disposed and floatable.

The front and lower edge portons 25 of the guard plates 6 and 7 are preferably arcuately curved and chamfered as shown so that these plates will present relatively thin curved edges extending along and normally disposed outwardly beyond the adjacent curved edges of the wheel 8, and the plates 6 and 7 should also be cut back to prevent drag on the wheel and may be rigidly attached to their respective rods 9 and 10 by screws 26 or otherwise, as shown in Figures 1, 2 and 3. The suspension rod 10 is somewhat shorter than the rod 9 since the latter engages the notch 24, but these rods 9 and 10 are normally maintained parallel to each other by means of set screws 27 coacting directly therewith at the openings 14, and other set screws 28 coacting with the pivot shaft 13 at the openings 12. Upon release of the set screws 27, the rods 9 and 10 may be adjusted forwardly and rearwardly within the openings 14 and relative to the blocks 11, and upon release of the set screws 28, the blocks 11 may obviously be adjusted along and about the axis of the pivot shaft 13, but normally all of the set screws 27 and 28 should be driven home. The collars 17 are also adjustably secured to the shaft 13 by means of similar set screws 27′ as shown in Figure 2, but when these collars have been properly positioned so as to permit oscillation of the shaft 13 without permitting undesirable longitudinal shifting thereof, they should not be released except for dismantling of the assemblage.

The U-shaped frame or bracket 15 from which the guard plates 6 and 7 blocks 11, and shaft 13 are swingably suspended, should be of relatively strong and rigid construction, and the mounting stud 18 is preferably disposed centrally of the bracket 15 and provides a swivel support about which the bracket may be angularly adjusted by merely releasing the front clamping nut 19. The plate 21 which limits the swinging motion of the guard plates 6 and 7 besides being vertically adjustable along the clamping cap screw 22, may also be adjusted angularly about the axis of this screw, and the slot 23 should be of sufficient width to normally permit slight free swinging movement of the guard plates 6 and 7 in vertical planes toward and away from the central axis of the abrasive wheel 8. This free swinging motion is important in order to permit the shoe heels 29 to be rolled in peripheral contact with the wheel 8 which is rotatable at high speed about the axis of its supporting shaft 30 in a well known manner.

During normal use of the improved apparatus, the guard assemblage should first be properly mounted upon the main wheel guard 20 with the aid of the stud 18 and nuts 19, with the guard plates 6 and 7 on opposite sides of the wheel 8. The guard plate 7 should then be adjusted with the aid of the set screws 27 and 28 and by manipulation of the cap screw 22, so as to properly position the edge portions 25 of the guard plates with respect to the peripheral edges of the abrasive wheel 8, substantially as shown in Figures 2 and 3. The free rotation of the wheel 8 should not be interfered with and the wheel 8 should not contact the guard plates 6 and 7 and these plates should be free to swing slightly in vertical planes by virtue of the formation of the slot 24 in the plate 21. The position of the plates 6 and 7 may obviously be thus adjusted so as to cooperate with abrasive wheels 8 of varioût widths and of various diameters disposed at different distances from the pivot shaft 13, and the slight swinging of the guard plates 6 and 7 in vertical planes will be simultaneous.

When such proper mounting and adjustment of the assemblage has been effected, the operator may bring the heels 29 of the successive shoes in engagement with the periphery of the abrasive wheel 8 and may roll the heel so as to finish the outer surface thereof as indicated in Figure 1, and during such finishing or scoring of the heels 29, the edge portions 25 of the guard plates 6 and 7 will coact with the recesses in the shoes between the heel portion of the sole and the upper. This coaction will prevent the uppers of the shoes from being brought into contact with the abrasive surface of the wheel 8, and the reason for providing two guard plates 6 and 7, one on each side of the wheel 8, is that the operator usually finishes one side of each heel 29 adjacent to one peripheral edge of the wheel 8, and then reverses the shoe so as to finish the other side of the heel adjacent to the other peripheral edge of the wheel 8. The slight rocking motion permitted by the limit stop 24 will permit the operator to press the heels 29 into snug engagement with the abrasive surface of the wheel 8, during the rolling of the heel during the scouring operations, and without the flexibility afforded by this vertical swinging movement, it may be impossible for the operator to thus effect contact between the wheel and heel and to avoid the grinding of local irregularities into the heel. It will thus be noted that the assemblage is extremely flexible in its adaptations, and enables the operator to quickly scour the successive heels without danger of having the abrasive wheel damage the uppers of the shoes with which the heels 29 are associated.

From the foregoing detailed description it will be apparent that my present invention provides an improved abrasive wheel guard assemblage which is simple and durable in construction and which is moreover highly efficient in operation. The various adjustments provided in the assemblage will permit the use thereof in conjunction with wheels of different sizes and having the main guards disposed different distances from the axis of rotation thereof, and the assemblage can obviously be readily constructed of relatively stock material and may be quickly assembled and dismantled. The improved device may obviously be applied to existing scouring machines and may be manufactured at moderate cost. The invention has gone into highly successful commercial use and has greatly enhanced the speed at which the heels can be scoured while positively preventing damaging of the shoe uppers such as has heretofore frequently occurred. In actual practice, the present improvement has actually simplified the heel scouring operation by at least 35 to 45 per cent, and has resulted in the production of heel seats which are far superior to those resulting from the prior methods whereby the application of the work to the wheels was unrestrained by guard plates such as shown and described herein.

The limited movement of the guard plates 6 and 7 toward and away from the grinding wheel 8 aids an operator to properly position the heels relative to the grinding wheel before the heels reach the grinding wheel and the operator pushes the shoe against the weight of the guard plates 6 and 7.

Where an operator becomes skillful with my guard plates 6 and 7, he may desire to set the guard plates an exact distance relative to the grinding wheel. This eliminates the necessity of the initial upward thrust of the guard plates. The exact setting and holding of the guard plates can be accomplished by moving the limiting plate 21 down until the upper wall of the notch 24 contacts the rod 9. Continued adjustment of the limiting plate 21 is made until the guard plates 6 and 7 are raised to the exact required distance relative to the grinding wheel, after which the limiting plate 21 is swung on its cap screw 22 tight against the rod 9 to bind against and hold the rod 9. The plate 21 is held against further movement by the tight adjustment of the cap screw 22.

It should be understood that it is not desired to limit this invention to the exact details of construction or to the precise mode of use, herein shown and described, for various modifications within the scope of the claims may occur to persons skilled in the art.

I claim:

1. In combination with an abrasive wheel rotatable about an axis, a guard plate disposed adjacent to a side of the wheel and having an arcuate edge projecting outwardly beyond the adjacent peripheral edge of the wheel, and mounting means for said plate formed to produce limited free swinging thereof toward and away from the wheel axis by work pressed against the abrasive wheel surface.

2. In combination with a wheel having an abrasive peripheral surface and being rotatable about a fixed axis, a guard plate disposed perpendicular to said axis adjacent to a side of the wheel and having an arcuate edge projecting outwardly slightly beyond the adjacent peripheral edge of the wheel and mounting means for said plate formed to produce limited free swinging thereof about an axis disposed parallel to the wheel axis toward and away from the latter by work pressed against said abrasive wheel surface.

3. In combination with an abrasive wheel rotatable about an axis, a guard plate disposed adjacent to a side of the wheel and having an arcuate edge projecting outwardly beyond the adjacent peripheral edge of the wheel, mounting means for said plate formed to produce limited free swinging thereof toward and away from the wheel axis by work pressed against the abrasive wheel surface, and means for effecting fixed adjustment of said plate both toward and away from the adjacent side of the wheel and toward and away from the wheel axis.

4. In combination with a wheel having an abrasive peripheral surface and being rotatable about a fixed axis, a guard plate disposed perpendicular to said axis adjacent to a side of the wheel and having an arcuate edge projecting outwardly slightly beyond the adjacent peripheral edge of the wheel, mounting means for said plate formed to produce limited free swinging thereof about an axis disposed parallel to the wheel axis toward and away from the latter by work pressed against said abrasive wheel surface, and means for effecting fixed adjustment of said plate both along the wheel axis and in a direction perpendicular thereto.

5. In combination with an abrasive wheel rotatable about an axis, a guard plate disposed on each of the opposite sides of the wheel and each having an arcuate edge projecting outwardly slightly beyond the adjacent peripheral wheel edge, and common supporting means for said plates formed to produce limited simultaneous free movement thereof toward and away from the wheel periphery by work applied to the wheel.

6. In combination with a wheel having an abrasive peripheral surface and being rotatable about a fixed axis, a guard plate disposed on each of the opposite sides of the wheel, said guard plates lying in parallel planes perpendicular to the wheel axis and each having an arcuate edge projecting outwardly slightly beyond the adjacent peripheral wheel edge, and common supporting means for said plate formed to produce simultaneous free swinging thereof about an axis disposed parallel to and remote from the wheel axis toward and away from the latter by work applied to the wheel periphery.

7. In combination with an abrasive wheel rotatable about an axis, a guard plate disposed on each of the opposite sides of the wheel and each having an arcuate edge projecting outwardly slightly beyond the adjacent peripheral wheel edge, common supporting means for said plates formed to produce limited simultaneous free movement thereof toward and away from the wheel periphery by work applied to the wheel, and means for effecting independent adjustment of said plates either toward said wheel or its axis.

8. In combination with a wheel having an abrasive peripheral surface and being rotatable about a fixed axis, a guard plate disposed on each of the opposite sides of the wheel, said guard plates lying in parallel planes perpendicular to the wheel axis and each having an arcuate edge projecting outwardly slightly beyond the adjacent peripheral wheel edge, common supporting means for said plate formed to produce simultaneous free swinging thereof about an axis disposed parallel to and remote from the wheel axis toward and away from the latter by work applied to the wheel periphery, and means for effecting independent adjustment of each of said plates both along the wheel axis and perpendicular thereto.

9. In combination with an abrasive wheel rotatable about a horizontal axis, a bracket mounted rearwardly of said wheel, a pivot shaft carried by said bracket approximately parallel to the wheel axis, an arcuate guard suspended from said shaft and being disposed closely adjacent to a side of said wheel but projecting slightly beyond the adjacent wheel edge, and means carried by said bracket for producing limited free swinging of said guard relative to the wheel axis by work applied to the wheel periphery.

10. In combination with an abrasive wheel rotatable about a fixed horizontal axis, a bracket disposed rearwardly of said wheel, a pivot shaft carried by said bracket parallel to the wheel axis, an arcuate guard suspended from said shaft on each side of the wheel and each projecting slightly beyond the adjacent wheel edge, and a limit stop carried by said bracket and coacting with only one of said guards for permitting limited simultaneous free swinging of both guards.

11. In combination with an abrasive wheel rotatable about a fixed horizontal axis, a bracket disposed rearwardly of said wheel, a pivot shaft carried by said bracket parallel to the wheel axis, an arcuate guard suspended from said shaft on each side of the wheel and each projecting slightly beyond the adjacent wheel edge, and a stop for limiting the movement of said guards relative to said wheel by work coacting with the latter.

12. In combination with an abrasive wheel rotatable about a fixed horizontal axis, a bracket disposed rearwardly of said wheel, a pivot shaft carried by said bracket parallel to the wheel axis, an arcuate guard suspended from said shaft on each side of the wheel and each projecting slightly beyond the adjacent wheel edge, and an adjustable stop carried by said bracket and coacting with said guards to limit the movement of the latter relative to said wheel by work pressed against the wheel periphery.

13. In combination with an abrasive wheel rotatable about a fixed horizontal axis, a bracket disposed rearwardly of said wheel, a pivot shaft carried by said bracket parallel to the wheel axis, an arcuate guide suspended from said shaft and arranged adjacent to a side of the wheel and projecting slightly beyond the adjacent wheel edge, and means for holding the guide an exact desired distance relative to the wheel edge.

14. In combination with an abrasive wheel rotatable about a fixed horizontal axis, a bracket disposed rearwardly of said wheel, a pivot shaft carried by said bracket parallel to the wheel axis, an arcuate guide suspended from said shaft and disposed adjacent to a side of the wheel and projecting slightly beyond the adjacent wheel edge, and a stop for limiting the movement of said guide relative to said wheel by work coacting with the latter when the stop is in one position and for holding the guide in a set position relative to the wheel when the stop is in another position.

15. In combination with an abrasive wheel rotatable about an axis, a guard plate disposed adjacent to a side of the wheel, and having an arcuate edge projecting outwardly beyond the adjacent peripheral edge of the wheel, mounting means for said plate formed to produce limited free swinging movement thereof toward and away from the wheel axis by work pressed against the abrasive wheel surface, and means for holding the plate in a desired set position relative to the wheel against swinging movement.

16. In combination with an abrasive wheel rotatable about a horizontal axis, a bracket mounted rearwardly of said wheel, a pivot shaft carried by said bracket approximately parallel to the wheel axis, blocks secured to said pivot shaft for movement therewith, rods carried by said blocks and projecting forwardly toward the grinding wheel, arcuate guard plates secured to the rods, said guard plates being disposed on each side of the wheel and each projecting slightly beyond the adjacent wheel edge, a stop carried by said bracket for receiving one of said rods for limiting swinging movement thereof, and means for adjusting the position of the stop on the bracket.

CLARENCE L. LOGEMANN.